INVENTOR
Edwin O. Martinson
ATTORNEYS

July 15, 1952     E. O. MARTINSON     2,603,342
HOPPER DISCHARGE CONTROL
Filed Aug. 31, 1946     3 Sheets—Sheet 2
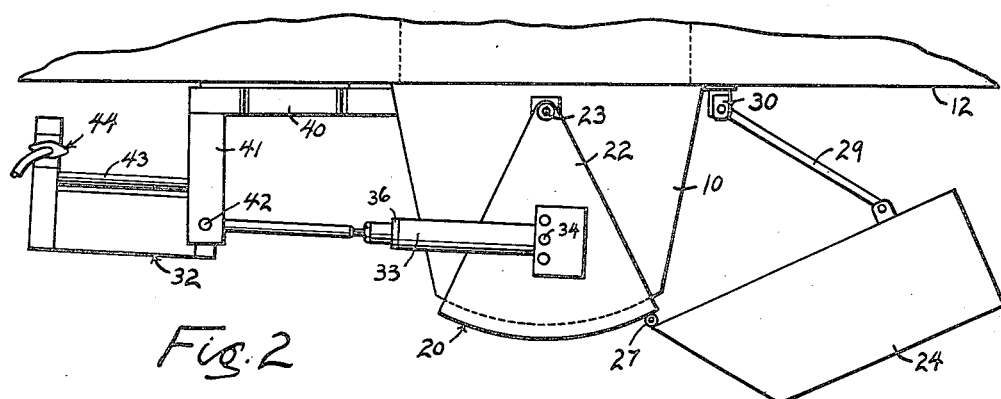
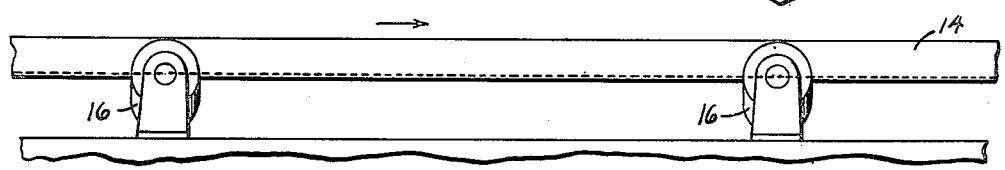
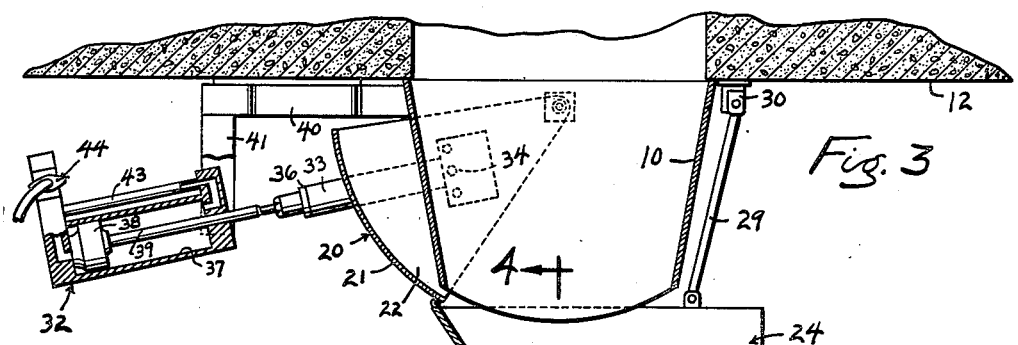
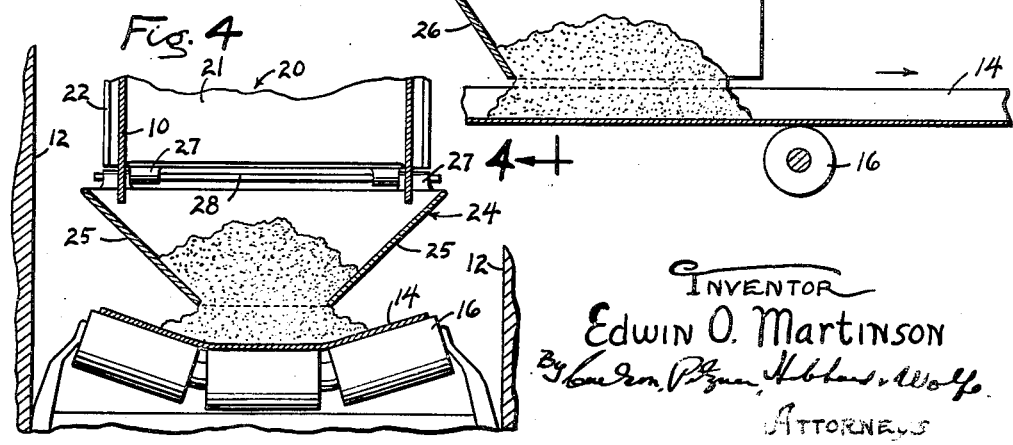
INVENTOR
Edwin O. Martinson
ATTORNEYS July 15, 1952 — E. O. MARTINSON — 2,603,342
HOPPER DISCHARGE CONTROL
Filed Aug. 31, 1946 — 3 Sheets-Sheet 3

INVENTOR
Edwin O. Martinson
ATTORNEYS

Patented July 15, 1952

2,603,342

UNITED STATES PATENT OFFICE 2,603,342

HOPPER DISCHARGE CONTROL

Edwin O. Martinson, Champaign, Ill., assignor to The C. S. Johnson Company, Champaign, Ill., a corporation of Illinois Application August 31, 1946, Serial No. 694,292

13 Claims. (Cl. 198—56)

The present invention pertains to means for controlling the discharge of materials from a hopper onto a conveyor or the like and concerns more especially a combined gate and chute structure for such hoppers.

The primary object of the invention is to provide a material handling apparatus of an advantageous character wherein the gate controlling the discharge of material from the hopper is equipped with a chute movable as an incident to the opening of the gate, into a position to guide and direct the material onto an underlying conveyor.

A further object lies in the provision of a combined gate and chute structure having the walls of the chute so constructed that no material can lodge thereon to hinder the operation of the gate.

Another object is to provide for the effectual operation of the gate and chute.

The objects and advantages thus generally set forth, together with other and ancillary advantages, will become apparent as the following description proceeds, taken in conjunction with the accompanying drawings, in which:

Fig. 2 is a side elevational view of the apparatus shown in closed position and arranged for power actuation, the view being fragmentary in that a signal device is not included.

Fig. 3 is a sectional side elevation of the apparatus shown in open position, the figure being fragmentary in that no signal device is shown.

Fig. 4 is a fragmentary sectional end elevation taken substantially along line 4—4 of Fig. 3.

Figure 1:
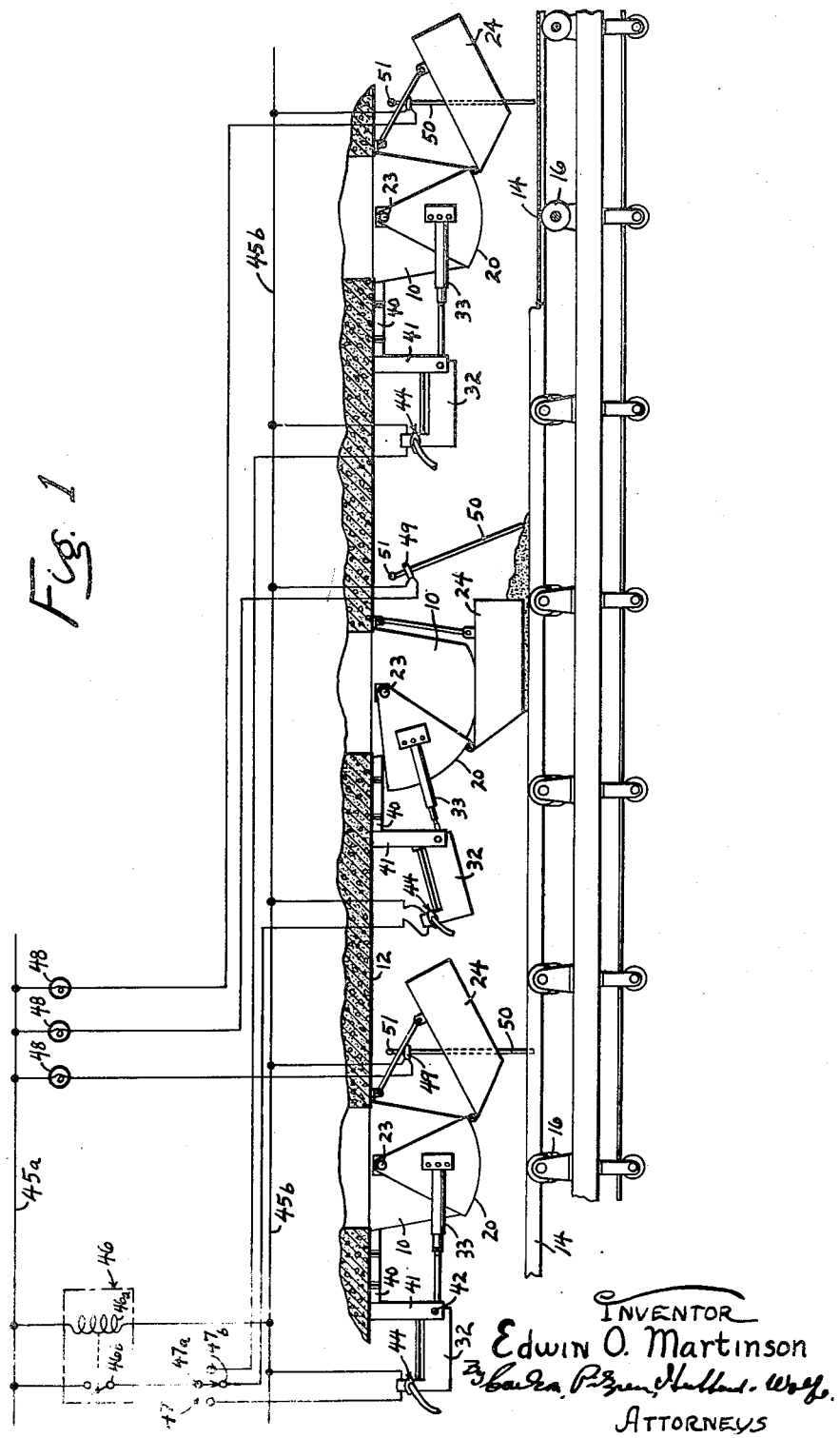
Figure 1 is a side elevational view, partly in section, of a plurality of the material handling apparatus disposed in linear relation along a belt conveyor, and including schematic wiring diagrams of the control and signal systems.
Figure 5:
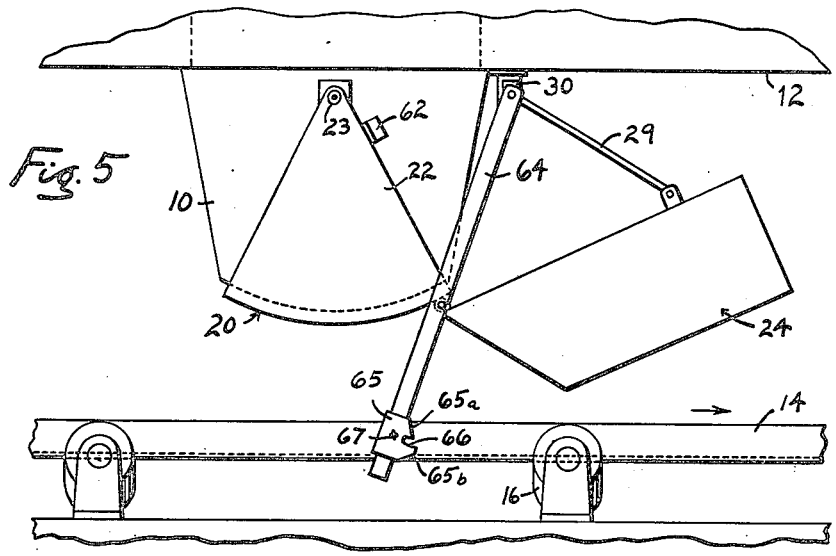
Fig. 5 is a side elevational view of the material handling apparatus shown in closed position and adapted for manual operation.

While the invention is susceptible of various modifications and alternative constructions, there is shown in the drawings and will herein be described in detail the preferred embodiment, but it is to be understood that it is not thereby intended to limit the invention to the specific form disclosed, but it is intended to cover all modifications and alternative constructions falling within the spirit and scope of the invention as expressed in the appended claims.

For purposes of illustration, I have shown in Fig. 1 a plurality of hoppers 10 disposed in linear relation to one another, all opening downwardly into a tunnel 12 (Fig. 4) below ground level. In the tunnel is contained a conveyor of the conventional endless belt type comprising a belt 14 running on suitable rollers 16 in such a way that the upper surface of the belt is dished or channeled so that loose material will be retained thereon. The materials, such as those used in making concrete mix, are suitably stored at ground level and are shoveled or otherwise conveniently deposited in the hoppers 10 for subsequent delivery onto the belt 14. The hoppers 10 have been shown as being of generally rectangular cross section, having a slight downward taper, and having an open bottom. The materials are discharged from the hoppers 10 through their open bottoms by gravity.

In accordance with my invention, each hopper is equipped with a combination gate and chute operative as an incident to the opening of the gate, into a position beneath the hopper 10 for directing the flow of material from the hopper onto the conveyor belt 14. In the present preferred embodiment, a gate 20 pivotally supported on the hopper has a bottom member 21 and substantially triangular side panels 22. The side panels extend upwardly from the ends of the bottom member 21 to straddle the hopper 10 and are pivotally supported on trunnions 23 that extend horizontally outwardly from opposite sides of the hopper 10 adjacent its top.

Figure 6:
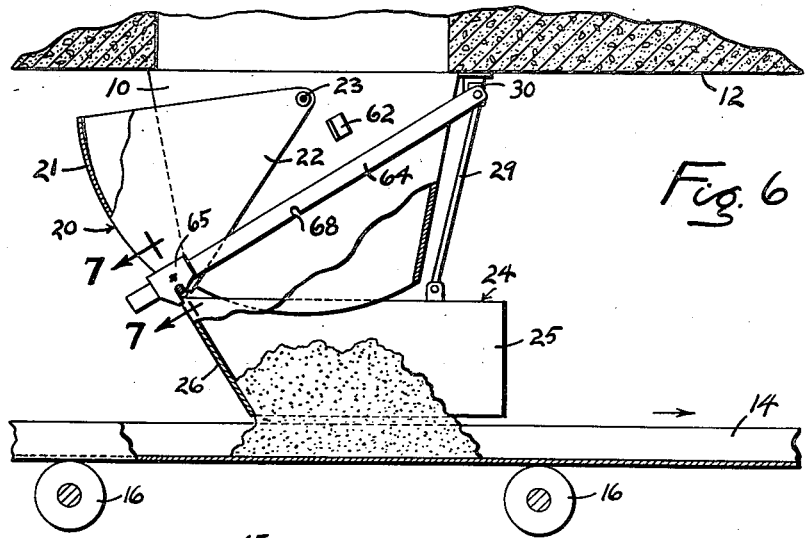
Fig. 6 is a sectional side elevation of the manually operable arrangement of the apparatus and showing the relative positions of the components that are assumed when the device is in fully opened position.

In accordance with my invention there is provided a chute 24 which is pivotally connected with the gate 20 and is pivotally mounted for movement therewith. As shown, the chute 24 comprises downwardly and inwardly slanting side walls 25 (Fig. 4) and a similarly slanting back wall 26 (Fig. 6) disposed between the side walls, the bottom and forward end of the chute being open.

The chute 24 is mounted on the forward edge of the gate 20 by hinge members 27 and is suspended on a link 29 which is pivoted on a bracket 30. The bracket, as shown, is secured to the roof of the tunnel 12 immediately adjacent the hopper 10.

The arrangement is such that when the gate is in closed position, the chute 24 is positioned forwardly of the hopper 10 and is upwardly inclined. As the gate is swung in an opening direction, the chute 24 moves with it, beneath the hopper 10, so as to become immediately effective as the material is released from the hopper to direct it properly onto the belt 14. When in its lower or operative position, the chute is spaced from the belt a short distance for clearance purposes. The sloping walls 25 and 26 of the chute cause the materials to be directed toward the central section of the belt (Fig. 4) and, further, prevent sudden discharge from the hopper tending to cause an overflow and subsequent loss of material.

As shown in Fig. 2, the length of the supporting link 29 and the degree of inclination of the back wall 26 have been so chosen that when the chute 24 is in its out of the way position with the gate closed, the lower edge of the back wall clears the belt sufficiently so that materials deposited on the belt from preceding hoppers will pass thereunder unhindered. At the same time, the back wall is sufficiently sloped to insure that no material will lodge thereon so as to interfere with the movement of the gate in the succeeding opening movement.

Opening and closing the gate 20 along with the corresponding lowering and raising of the chute 24 is preferably accomplished by means of a power actuator. In the present instance, the power actuating arrangement comprises a fluid ram unit 32 (Fig. 1) and a gate yoke 33. The gate yoke is pivotally attached at 34 to the gate side panels 22 below the trunnions 23 and includes a crosshead 36 which carries thereon suitable means for detachably securing the yoke to the ram 32.

The fluid ram 32 is of the piston and cylinder type and comprises a cylinder 37 and a piston 38 slidable within the cylinder for longitudinal extension and contraction of the unit. Extending from the piston 38 and detachably secured to the gate yoke crosshead 36 is a piston rod 39. To support the ram 32 in operative position, a pair of arms 40 are rigidly secured to the top of the hopper 10 and extend horizontally outwardly along the top of the tunnel 12. The outer ends of the arms 40 have fixed thereto depending legs 41. The ram 32 is rockably supported between the lower ends of the legs 41 on pivot pins 42.

Upon admitting pressure fluid such as compressed air to the outer end of the cylinder 37 and exhausting fluid from the hopper end of the cylinder, in the present instance through an air conduit 43, the piston 38 is actuated to cause the gate to swing from open to closed position and to carry the chute into its out-of-the-way position. Conversely, when pressure fluid is admitted to the hopper end of the cylinder 37 by way of the conduit 43 and exhausted from its opposite end, the piston 38 is retracted, closing the gate and lowering the chute into dispatching position.

Means is preferably employed to actuate the fluid rams 32 selectively, from some remote location. To this end, admission of pressure fluid to and from each cylinder 37 is controlled by valve means, preferably in the form of a two position reversing valve 44 arranged for electromagnetic control in a manner well understood in the art to effect operation of the ram alternately in opposite directions according to the position of the valve. The latter may be of the type disclosed in the applicant's copending application Serial No. 694,293, filed August 31, 1946, and now abandoned.

To actuate the electromagnetically controlled valve 44, current is supplied thereto from a pair of conductors 45a and 45b. Included in the control circuit is a timer 46 that permits adjustable setting of its operating or conducting interval. Any suitable form of timer can be employed, and the one diagrammatically indicated in Fig. 1 is of the induction type having a coil 46a and a switch member 46b. To one of the timer switch terminals is connected the common terminal 47a of a manually operable hopper selecting switch 47. To the switch terminals 47b are connected one of each of the respective hopper valve terminals. Each of the other hopper valve terminals are connected to the conductor 45b. With the timer 46 actuated and set for any desired interval for the run of material, its operation together with that of the particular valve 44 connected thereto by the switch 47 is such as to cause the gate controlled by that valve assembly to be closed to stop the flow of material at the end of the interval even if there should be no operator in attendance.

When the flow of material from one of the hoppers 10 is cut off, it is usually desirable to deliver material from the succeeding hopper onto the belt 14 as soon thereafter as possible; however, its gate must not be opened until after the material from the first hopper has flowed past it. Moreover, if a hopper becomes empty, or if the material, such as sand, arches over at the gate opening, delivery will cease. In any event, the operator at a remote location must be notified. To this end, a signal system is employed that will inform the operator whether or not material is being carried past the particular point in question. In the present instance a system comprising signal lights controlled by paddle operated mercury switches is used. Referring to Fig. 1, it will be seen that signal lights 48 are connected in series with mercury switches 49, and this simple series circuit is connected across the supply conductors 45a and 45b. The switches 49 are mounted on paddles 50 which are supported on pivot pins 51 located conveniently adjacent the roof of the tunnel 12. The lower ends of the paddles 50 extend downwardly to a point just above the belt 14. When there is no material flowing, the paddles depend vertically and the mercury switch 49 is open. When material is being conveyed past a particular paddle it is swung outwardly and tilted so that the mercury switch 49 carried thereon is closed, thus completing the aforementioned series circuit and causing the lamp 48 to light.

Figure 7:
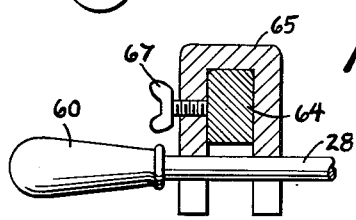
Fig. 7 is a fragmentary sectional view taken substantially along the line 7—7 of Fig. 6.

Should power actuation of the gate not be desired, provision is made for manual operation. To this end a simple and effective arrangement is employed to permit the gate to be swung between its open and closed positions by an operator, and stop means are utilized to retain the gate in the desired position. In the present instance, as shown in Fig. 7, the hinge rod 28 for the chute is extended outwardly to project beyond the gate and chute and is fashioned into a handle 60. This handle is grasped by the operator and moved to swing the combined gate and chute structure. Stops 62 are provided on the hopper 10 adjacent the trunnions 23 and in such position as to limit the closing travel of the gate. Means is provided for retaining the gate and chute in an open position, and such means is preferably made adjustable so that the gate can be retained in partially opened position, thereby permitting control of the flow of material from the hopper. In the exemplary embodiment the foregoing is accomplished in the provision of a latch bar 64 pivotally secured at its upper end to the bracket 30. Toward the lower end of the bar 64 there is adjustably fastened a latch member 65. The latch member 65 extends laterally outwardly beyond the bar 64 and has an outwardly opening notch 66 therein which is adapted to engage the extended end of the rod 60 to retain the gate in opened position. To guide the rod to the notch the portion 65a of the projecting edge above the notch slants outwardly and downwardly. To prevent the handle from going beyond the notch the lower portion 65b of the projecting edge extends outwardly perpendicularly to the bar and beyond the upper portion 65 of the projecting edge, thus forming a stop. A thumbscrew 67 is threaded through the latch member 65 and frictionally engages the bar 64 thereby permitting of adjustable positioning of the latch member on the bar.

When material is in the hopper 10 and the gate is closed, the frictional holding pressure caused by the weight of the material will retain the gate in such position. However, to maintain the gate in closed position when the hopper is empty a holding means is provided. Preferably this is in the form of a notch 68 in the bar 64 and so located on the bar that it engages the handle 60 when closed position is attained.

I claim as my invention:

1. In a material handling apparatus having a hopper and a conveyor disposed below the hopper, the combination of a gate pivotally supported on and adapted to close said hopper, a chute, means pivoting the inner end of said chute on said gate, means guidingly supporting the outer end of said chute, and actuating means for simultaneously swinging said gate and chute between open and closed positions to control the discharge of material from said hopper, said chute supporting means retaining the chute in an upraised condition clear of the conveyor when said gate is in closed position and maintaining the chute with its lowermost edges substantially parallel with the conveyor when the gate is in open position.

2. In a material handling apparatus having a belt conveyor and a hopper discharging onto said belt conveyor, the combination of gate means pivoted on the hopper and a chute extending longitudinally with respect to the belt conveyor, said chute being pivotally supported at its inner end on said gate means, a link depending from a point adjacent the top of said hopper and pivotally connected to the outer end of said chute, said chute comprising downwardly slanting side and back walls, and said chute and gate means being movable together between open and closed positions to control the discharge of materials from said hopper and to direct the materials centrally onto said belt conveyor, said link guidingly supporting the outer end of said chute and being of a length to raise said chute clear of the conveyor when said gate is closed and to lower said chute into an operative position wherein said chute is substantially parallel to the conveyor when said gate is open.

3. In a material handling apparatus having a belt conveyor and a hopper discharging over said belt conveyor, the combination of a gate, means pivotally supporting the gate for swinging movement between open and closed positions with respect to the hopper, and a chute pivotally supported at its inner end on said gate and pivotally supported at its outer end adjacent said hopper, said chute and gate being swingable together between an open position in which the chute is beneath the hopper and substantially parallel to the belt conveyor to direct the flow of material toward the center of said belt conveyor and a closed position in which the chute is swung upwardly adjacent one side of the hopper clear of the belt conveyor to permit unobstructed passage of material on said belt conveyor, said chute having a back wall sloping downwardly and forwardly when in said open position.

4. In a material handling apparatus, the combination of a hopper having a discharge opening therein, a gate member adapted to close said opening, a chute member hinged at one end to said gate and guidingly supported at its other end, actuating means by which said gate and chute can be swung simultaneously between open and closed positions, and latch means including an element carried by one of said members and a second element for coaction therewith adapted to retain both said gate and chute members in open or closed positions.

5. In a material handling apparatus, the combination of a hopper having a discharge opening therein, a gate adapted to close said opening, a chute hinged at one end to said gate and guidingly supported at its other end, manually operable actuating means by which said gate and chute can be swung between open and closed positions, and latch means including a bar pivotally supported adjacent the top of said hopper and a latch member adjustably secured to said bar, said latch means being adapted to retain said gate and chute in fully or partially opened position.

6. In a material handling apparatus, the combination of a hopper, a gate and chute structure adapted to control the flow of material from said hopper, manually operable actuating means by which said structure can be swung between open and closed positions, retaining means including a projection on said structure, a bar pivotally supported adjacent the top of said hopper, and a latch member adjustably secured to the bar and adapted to engage said projection to hold said structure in open or partially open position.

7. In a material handling apparatus, the combination of a hopper, a gate and chute structure adapted to control the flow of material from said hopper, manually operable actuating means by which said structure can be swung between open and closed positions, retaining means including a projection on said structure, a latch bar pivotally supported adjacent the top of said hopper and a latch member adjustably secured to the bar and adapted to engage said projection to hold said structure in open or partially open position, said bar having a latch means thereon for engagement with said projection to hold said structure in fully closed position.

8. In a material handling apparatus, the combination of a hopper having a discharge opening therein, a gate adapted to close said opening, a chute, said gate and chute having hinge members thereon, a hinge pin adapted to engage said hinge members to pivotally connect said gate and chute, one end of said hinge pin extending outwardly beyond said gate and chute and fashioned into a handle by means of which said gate and chute can be moved between open and closed positions.

9. In a material handling apparatus, the combination of a hopper having a discharge opening therein, a gate adapted to close said opening, a chute, said gate and chute having hinge members thereon, a hinge pin adapted to engage said hinge members to pivotally connect said gate and chute, one end of said hinge pin extending outwardly beyond said gate and chute and fashioned into a handle by means of which said gate and chute can be moved between open and closed positions and retaining means including a bar pivotally supported adjacent the top of said hopper, said bar having a latch member adjustably secured thereto and adapted to engage said handle to hold said gate and chute in fully or partially opened positions.

10. In a material handling apparatus, the combination of a hopper having a discharge opening therein, a gate adapted to close said opening, a chute, said gate and chute having hinge members thereon, a hinge pin adapted to engage said hinge members to pivotally connect said gate and chute, one end of said hinge pin extending outwardly beyond said gate and chute and fashioned into a handle by means of which said gate and chute can be moved between open and closed positions and a latch bar having a notch therein adapted to engage said handle when said gate and chute are moved to fully closed position.

11. In a material handling apparatus having a hopper and a conveyor disposed below the hopper, the combination of a gate having side portions pivotally supported on the hopper and a central portion interposed between said side portions and adapted to close said hopper, a chute, means pivotally supporting the inner end of said chute on said gate, means guidingly supporting the outer end of said chute, and actuating means for simultaneously swinging said gate and chute between open and closed positions to control the discharge of material from said hopper, said chute supporting means retaining the chute in an upraised condition clear of the conveyor when said gate is in closed position and maintaining the chute with its lowermost edges substantially parallel with the conveyor when the gate is in open position, said actuating means including relatively movable elements, one of said elements being pivotally supported at one side of said hopper and the other of said elements being pivotally connected to one of the side portions of said gate.

12. In a material handling apparatus having a belt conveyor and a hopper discharging onto said belt conveyor, the combination of gate means pivoted on the hopper and a chute extending longitudinally with respect to the belt conveyor, said chute being pivotally supported at its inner end on said gate means, a pivotally supported link depending from a point spaced upwardly from the bottom of the hopper and pivotally connected to the outer end of said chute, said chute comprising downwardly slanting side and back walls, and an actuator for moving said chute and gate means together between open and closed positions so as to control the discharge of materials from the hopper and to direct the materials centrally onto the belt conveyor, said link being of a length to raise said chute clear of the conveyor when said gate is closed and to lower said chute into an operative position wherein said chute is substantially parallel to the conveyor when said gate is open, and said actuator including two relatively movable elements, one of said elements being pivotally connected to said gate means at a point spaced upwardly from the lowermost portion thereof, and with the other of said elements pivotally supported in rearwardly spaced relation to said hopper and above the lowermost portion thereof whereby said actuator is always spaced above the belt conveyor regardless of the position of the actuator.

13. In a material handling apparatus having a belt conveyor and a hopper discharging over said belt conveyor, the combination of a gate, means pivotally supporting said gate for swinging movement between open and closed positions with respect to the hopper, a chute pivotally supported at its inner end on said gate and pivotally supported at its outer end adjacent said hopper, said chute and gate being swingable together between an open position in which the chute is beneath the hopper and substantially parallel to the belt conveyor to direct the flow of material toward the center of said belt conveyor and a closed position in which the chute is swung upwardly adjacent one side of the hopper clear of the belt conveyor to permit unobstructed passage of material on the belt conveyor, said chute having a back wall sloping downwardly and forwardly when in said open position, and actuating means for swinging said gate and chute together between their said open and closed positions and for maintaining the same in said positions, said actuator including relatively extensible elements one of which is pivotally connected to said gate and the other of which is pivotally supported in spaced relation to the hopper.

EDWIN O. MARTINSON.

REFERENCES CITED

The following references are of record in the file of this patent:

UNITED STATES PATENTS

| Number | Name | Date |
| --- | --- | --- |
| 96,767 | Baird | Nov. 16, 1869 |
| 115,256 | Wakefield | May 23, 1871 |
| 586,758 | Carter | July 20, 1897 |
| 1,135,980 | Arndt | Apr. 20, 1915 |
| 1,287,711 | Lichtenberg | Dec. 17, 1918 |
| 1,362,977 | Wilputte | Dec. 21, 1920 |
| 1,427,860 | Schwalb | Sept. 5, 1922 |
| 1,834,787 | Kilcarr | Dec. 1, 1931 |
| 1,925,990 | Pampel | Sept. 5, 1933 |

FOREIGN PATENTS

| Number | Country | Date |
| --- | --- | --- |
| 136,763 | Germany | Dec. 8, 1902 |
| 167,243 | Germany | Jan. 22, 1906 |
| 5,111 | Great Britain | Apr. 1, 1915 |
| 319,219 | Germany | Feb. 28, 1920 |